United States Patent Office.

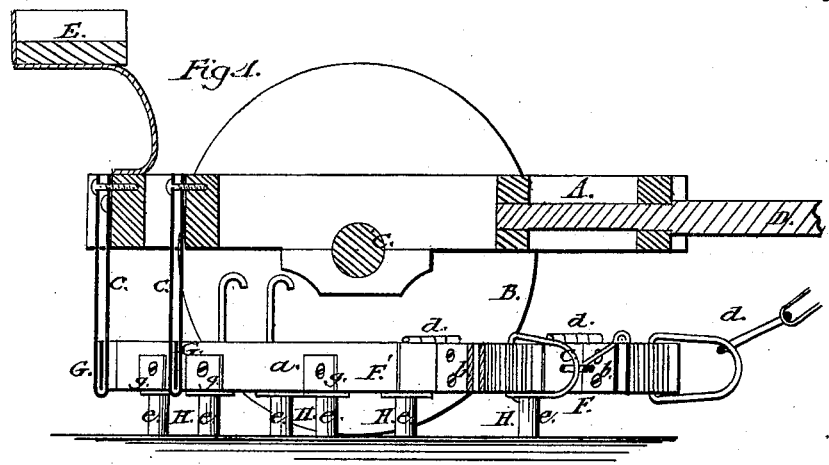
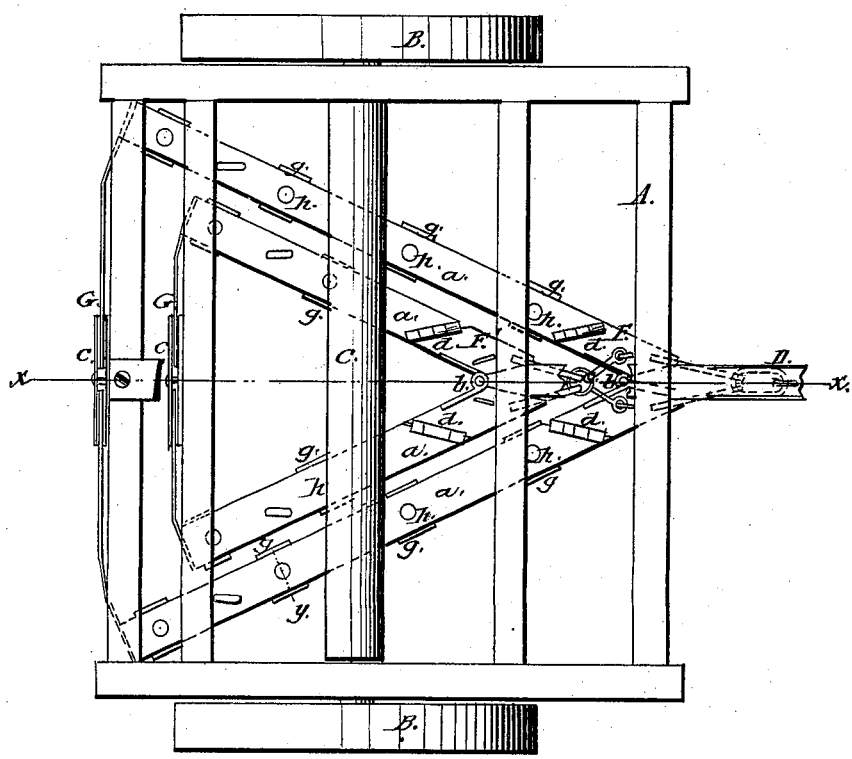

GEORGE PADDINGTON, OF SPRINGVILLE, IOWA.

Letters Patent No. 98,100, dated December 21, 1869.

IMPROVEMENT IN HARROWS.

The Schedule referred to in these Letters Patent and making part of the same.

*To all whom it may concern:*

Be it known that I, GEORGE PADDINGTON, of Springville, in the county of Linn, and State of Iowa, have invented a new and improved Harrow; and I do hereby declare that the following is a full, clear, and exact description thereof, which will enable others skilled in the art to make and use the same, reference being had to the accompanying drawings, forming part of this specification.

In the accompanying sheet of drawings—

Figure 1 is a side sectional view of my invention, taken in the line $x\, x$, fig. 2.

Figure 2 is a plan or top view of the same.

Figure 3, a vertical section of a portion of the harrow, taken in the line $y\, y$, fig. 2.

Similar letters of reference indicate corresponding parts.

A represents a rectangular frame, which is mounted on two wheels, B B, the latter being keyed on an axle, C, which turns with the wheels.

D is the draught-pole, attached to the front part of the frame A, and

E, the driver's seat, placed on the rear part thereof.

The harrow is composed of two parts, F F', each part being of V-form, and placed one within the other, as shown clearly in fig. 2.

The front ends of the oblique sides $a\, a'$ of each part of the harrow are connected by a vertical hinge, $b$, and the rear ends of said sides are connected by extension-bars G, arranged in any proper way.

The parts F F' are connected at their front ends by means of a coupling-link, $c$.

By this means, the two parts of the harrow may be expanded or contracted, as desired.

The rear ends of the parts F F' of the harrow are suspended from the frame A by plates $o$, and the front end of the outer part F is suspended from the frame or rear part of the draught-pole by a link, $d$.

H represents the teeth of the harrow, which are composed each of a tube, $e$, having a flange, $f$, at its upper end. These flanges of the tubes rest on the edges of the plates $g$ around the holes, (see fig. 3,) through which the tubes pass, said plates being attached to the side-pieces $a$ of the harrow, and through said side-pieces pins $h$ pass into the tubes $e$, said pins serving to steady the tubes and retain them firmly in position.

The tubes $e$, by this arrangement, are allowed to revolve or turn freely, and consequently will not be liable to choke or clog up, as is the case with the ordinary rigid or fixed teeth.

The side-pieces $a\, a$ are divided or composed each of two or more parts, connected by hinges $d$, which admit of the side-pieces being raised whenever required in order to pass over obstructions.

Having thus described my invention,

What I claim as new, and desire to secure by Letters Patent, is—

A harrow-tooth, formed of the tube $e$, revolving about a central pin, $h$, as shown and described.

GEORGE PADDINGTON.

Witnesses:
D. L. PALMER,
C. M. HOLLIS.